US011094201B2

(12) United States Patent
Wu (10) Patent No.: US 11,094,201 B2
(45) Date of Patent: Aug. 17, 2021

(54) METHOD, DEVICE AND SYSTEM FOR VEHICLE POSITIONING

(71) Applicant: TuSimple, Inc., San Diego, CA (US)

(72) Inventor: Nan Wu, Beijing (CN)

(73) Assignee: TUSIMPLE, INC., San Diego, CA (US)

(*) Notice: Subject to any disclaimer, the term of this patent is extended or adjusted under 35 U.S.C. 154(b) by 0 days.

(21) Appl. No.: 16/272,827

(22) Filed: Feb. 11, 2019

(65) Prior Publication Data

US 2019/0251847 A1 Aug. 15, 2019

(30) Foreign Application Priority Data

Feb. 11, 2018 (CN) .......................... 201810142491.1

(51) Int. Cl.
*G08G 1/00* (2006.01)
*G08G 1/056* (2006.01)
*G08G 1/052* (2006.01)

(52) U.S. Cl.
CPC ............ *G08G 1/205* (2013.01); *G08G 1/052* (2013.01); *G08G 1/056* (2013.01)

(58) Field of Classification Search
CPC ............ G08G 1/205; G08G 1/096716; G08G 1/0116; G08G 1/096783; G08G 1/0965; G06Q 30/0241; H04W 4/44
USPC ....................................................... 340/988
See application file for complete search history.

(56) References Cited

U.S. PATENT DOCUMENTS

| 5,214,793 A * | 5/1993 | Conway ........... G08G 1/096716 340/905 |
| 9,047,256 B2 * | 6/2015 | Carlson .............. G06Q 30/0242 |
| 2006/0089870 A1 * | 4/2006 | Myhr ..................... G06Q 30/02 705/14.5 |
| 2007/0257816 A1 * | 11/2007 | Lyle ................... G06Q 30/0265 340/905 |
| 2015/0227965 A1 * | 8/2015 | Drysch .............. G06K 9/00791 705/14.45 |
| 2016/0068160 A1 * | 3/2016 | Schofield ............... G06K 9/209 701/70 |

(Continued)

FOREIGN PATENT DOCUMENTS

| CN | 105718860 A | 6/2016 |
| CN | 105788328 A | 7/2016 |

(Continued)

OTHER PUBLICATIONS

U.S. Appl. No. 16/272,883 Final Office Action dated Feb. 19, 2020.

(Continued)

*Primary Examiner* — Emily C Terrell
(74) *Attorney, Agent, or Firm* — Paul Liu; Julie J. Muyco; Perkins Coie, LLP (57) ABSTRACT

The present disclosure provides a system, a method and an apparatus for vehicle positioning. The method includes: acquiring positioning information pre-stored in a roadside device while a vehicle is moving, the positioning information including direction information and/or position information associated with a position of the roadside device; determining a current position of the vehicle based on position information determined by a vehicle-mounted positioning device and the positioning information acquired from the roadside device.

16 Claims, 2 Drawing Sheets (56) References Cited

U.S. PATENT DOCUMENTS

| | | |
|---|---|---|
| 2017/0341640 A1 | 11/2017 | Liu |
| 2018/0120121 A1* | 5/2018 | Rosario ............... G08G 1/0969 |
| 2018/0345955 A1 | 12/2018 | Kim |
| 2018/0357905 A1 | 12/2018 | Boss |
| 2019/0094330 A1* | 3/2019 | Adireddy ................. G01S 1/20 |
| 2019/0236382 A1* | 8/2019 | Hall .................. G01C 21/3492 |
| 2019/0370573 A1* | 12/2019 | Duan ................ G06K 9/00308 |
| 2020/0073520 A1* | 3/2020 | Mohan .............. G06Q 30/0235 |

FOREIGN PATENT DOCUMENTS

| | | | |
|---|---|---|---|
| CN | 106093954 | A | 11/2016 |
| CN | 106710281 | A | 5/2017 |
| CN | 206574100 | U | 10/2017 |
| GB | 2547076 | A | 8/2017 |
| KR | 101739235 | B1 | 5/2014 |
| WO | 2017046979 | A1 | 3/2017 |

OTHER PUBLICATIONS

Chinese Application No. 201810142491.1 Office Action dated Apr. 15, 2020.
Chinese Application No. 201810142491.1 First Search dated Apr. 7, 2020.

* cited by examiner

Obtain, by a vehicle-mounted processing device of a vehicle, position information determined by a vehicle-mounted positioning device and positioning information acquired by an information acquiring device of the vehicle, the positioning information being acquired by the information acquiring device of the vehicle from a roadside device while the vehicle is moving, and the positioning information including direction information and/or position information associated with a position of the roadside device Determine a current position of the vehicle based on the position information determined by the vehicle-mounted positioning device and the positioning information acquired by the information acquiring device from the roadside device

METHOD, DEVICE AND SYSTEM FOR VEHICLE POSITIONING

PRIORITY CLAIM AND RELATED APPLICATION

This U.S. patent document claims the priority of and the benefits of Chinese Patent Application No. 201810142491.1 of the same title and content that was filed by Applicant Beijing Tusen Weilai Technology Co., Ltd. at the State Intellectual Property Office of China (SIPO) on Feb. 11, 2018, which is incorporated by reference herein in its entirety.

TECHNICAL FIELD

The present disclosure relates to intelligent transportation, and more particularly, to a system, a method and an apparatus for vehicle positioning.

BACKGROUND

Currently, some positioning schemes in the related art, e.g., Global Positioning System (GPS) based positioning schemes, can determine a position of a vehicle or object efficiently and accurately. However, in some application scenarios, e.g., in a coastal port area, a warehouse, a mining area, a logistics park or the like, GPS signals may be weak or unavailable as there may be many occlusions or even places where signals are nearly shielded in these scenarios. In this case, a vehicle or object cannot determine its own position accurately by using a vehicle-mounted GPS device.

SUMMARY

The present disclosure provides a system, a method and an apparatus for vehicle positioning.

In an aspect of the present disclosure, a system for vehicle positioning is provided. The system includes a vehicle and at least one roadside device. The at least one roadside device is on a side of a road, on a surface of the road or above the road. The roadside device is configured to store predetermined positioning information including direction information and/or position information associated with a position of the roadside device. The vehicle includes an information acquiring device configured to acquire the predetermined positioning information stored in the roadside device while the vehicle is moving. The vehicle further includes a vehicle-mounted processing device configured to obtain position information determined by a vehicle-mounted positioning device of the vehicle and the positioning information acquired by the information acquiring device and determine a current position of the vehicle based on the position information determined by the vehicle-mounted positioning device and the positioning information acquired by the information acquiring device from the roadside device.

In another aspect of the present disclosure, a method for vehicle positioning is provided. The method includes: obtaining, by a vehicle-mounted processing device of a vehicle, position information determined by a vehicle-mounted positioning device and positioning information acquired by an information acquiring device of the vehicle, the positioning information being acquired by the information acquiring device of the vehicle from a roadside device while the vehicle is moving, and the positioning information including direction information and/or position information associated with a position of the roadside device; and determining, by the vehicle-mounted processing device, a current position of the vehicle based on the position information determined by the vehicle-mounted positioning device and the positioning information acquired by the information acquiring device from the roadside device.

In yet another aspect of the present disclosure, an apparatus in a vehicle for vehicle positioning is provided. The apparatus includes a processor and at least one memory storing at least one machine executable instruction. The processor is operative to execute the at least one machine executable instruction to: obtain position information determined by a vehicle-mounted positioning device of the vehicle and positioning information acquired by an information acquiring device of the vehicle, the positioning information being acquired by the information acquiring device of the vehicle from a roadside device while the vehicle is moving, and the positioning information including direction information and/or position information associated with a position of the roadside device; and determine a current position of the vehicle based on the position information determined by the vehicle-mounted positioning device and the positioning information acquired by the information acquiring device from the roadside device.

In still another aspect of the present disclosure, an apparatus in a vehicle for vehicle positioning is provided. The apparatus includes an obtaining module configured to obtain position information determined by a vehicle-mounted positioning device of the vehicle and positioning information acquired by an information acquiring device of the vehicle, the positioning information being acquired by the information acquiring device of the vehicle from a roadside device while the vehicle is moving, and the positioning information including direction information and/or position information associated with a position of the roadside device; and a determining module configured to determine a current position of the vehicle based on the position information determined by the vehicle-mounted positioning device and the positioning information acquired by the information acquiring device from the roadside device.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art.

Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In order to solve the problem in the related art that a position of a vehicle or an object cannot be determined accurately when it is in a scenario where there are many occlusions or weak signals, the embodiments of the present disclosure provide a system, a method and an apparatus for vehicle positioning. With the solutions according to the embodiments of the present disclosure, a roadside device is provided on a side of a road for facilitating positioning. The roadside device has positioning information pre-stored therein. An information acquiring device of a vehicle acquires the positioning information pre-stored in the roadside device while the vehicle is moving. The vehicle determines a current position of the vehicle based on position information determined by a vehicle-mounted positioning device and the positioning information acquired from the roadside device. Therefore, the position of the vehicle may be determined accurately even in a scenario where there are many occlusions or weak signals. In this way, the above problem in the related art may be solved.

Figure 1:
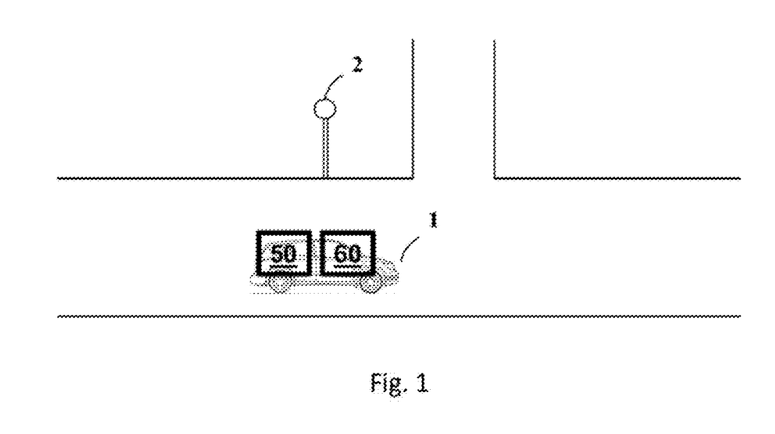
FIG. 1 is a schematic diagram showing a structure of a system for vehicle positioning according to some embodiments of the present disclosure.

FIG. 1 is a schematic diagram showing a system for vehicle positioning according to some embodiments of the present disclosure. The system includes a vehicle 1 and at least one roadside device 2. The at least one roadside device 2 is on a side of a road, on a surface of the road or above the road.

The roadside device 2 may be configured to store predetermined positioning information including direction information and/or position information associated with a position of the roadside device.

The vehicle 1 may be configured to acquire the predetermined positioning information stored in the roadside device 2 by an information acquiring device 3 (not shown in FIG. 1) arranged in the vehicle 1 while the vehicle 1 is moving; and determine a current position of the vehicle by a vehicle-mounted processing device 4 based on position information determined by a vehicle-mounted positioning device and the positioning information acquired by the information acquiring device 3 from the roadside device.

The system shown in FIG. 1 may be applied to various application scenarios where there are many occlusions or weak signals, e.g., a coastal port area, a highway port area, a warehouse, a mining area, a logistics park or the like. The vehicle-mounted positioning device of the vehicle 1 may not be able to receive any GPS signals at any time. The predetermined positioning information stored in the roadside device 2 may provide an accurate reference for positioning the vehicle 1, and the information acquiring device 3 of the vehicle 1 may acquire the predetermined positioning information stored in the roadside device 2. The vehicle-mounted processing device 4 of the vehicle 1 may determine the current position of the vehicle 1 based on the position information determined by the vehicle-mounted positioning device and the positioning information acquired from the roadside device 2.

The vehicle 1 may be provided with a number of vehicle-mounted devices, e.g., the information acquiring device 3 and the vehicle-mounted processing device 4. Here, the information acquiring device 3 may include one or any combination of Structure 1: a camera and an analyzing device, or Structure 2: a vehicle-mounted communication device and an analyzing device. The vehicle-mounted processing device 4 may include a processor and at least one memory. The vehicle 1 may further be provided with the vehicle-mounted positioning device, a vehicle-mounted ranging device and other vehicle-mounted devices for assisted driving, intelligent driving or unmanned driving. The vehicle-mounted processing device 4 in the vehicle 1 may store various types of data, e.g., pre-stored map data for application scenarios, and data obtained while the vehicle is moving such as positioning data, ranging data, communication data, and the like. The vehicle-mounted processing device 4 may process these types of data to determine the current position of the vehicle.

The roadside device 2 may be any of various types of devices. As described below, it may include any one or combination of the following two types of device structures.

Roadside Device I:

The roadside device 2 may be an image display device or billboard. The device may be configured to display a predetermined image containing the predetermined positioning information. The predetermined image may be any of various forms of images, e.g., a bar code, a Quick Response (QR) code, a text, a number, a predetermined graph, a predetermined mark, a predetermined code, or any combination thereof. For example, it may be positioning information represented in texts and numbers directly, direction information represented by a QR code, direction information and/or position information represented by a combination of a bar code and a text or a combination of a bar code and a number, or any other equivalent or alternative forms of information representation.

Correspondingly, for the predetermined image displayed on the roadside device 2, the vehicle 1 may capture the predetermined image displayed on the roadside device 2 using a vehicle-mounted camera included in the information acquiring device 3. Further, an analyzing device included in the information acquiring device 3 may identify the positioning information from the captured image.

Roadside Device II:

Alternatively, the roadside device 2 may be a communication device including a switch device and a communication transmitter having the predetermined positioning information pre-stored therein. When the vehicle 1 is on the move, the vehicle 1 may trigger the switch device and then the switch device may trigger the communication transmitter to perform a transmission operation. The communication transmitter may transmit the positioning information in response to the trigger, and a communication device in the vehicle 1 may receive the positioning information.

Here, the switch device of the roadside device 2 may include one or any combination of a mechanical switch device, a photoelectrical switch device, an electric approach switch, or a touch switch. The switch device may be provided on the side of the road, on the surface of the road or above the road. The communication transmitter of the roadside device 2 may be a communication device based on any of various communication protocols, e.g., a Radio Frequency Identification Device (RFID) protocol, a Wireless Fidelity (WIFI) protocol, a Vehicle-To-Everything (V2X) based communication protocol, or any of various mobile communication protocols.

Correspondingly, a vehicle-mounted communication receiver included in the information acquiring device 3 may be configured to receive, after the switch device is triggered by the vehicle, a positioning message transmitted from the communication transmitter of the roadside device in response to the trigger, and the analyzing device included in the information acquiring device 3 may be configured to parse the positioning message to obtain the positioning information.

In the following, the operation principles of the vehicle 1 and the vehicle-mounted processing device 4 will be explained.

Figure 2:
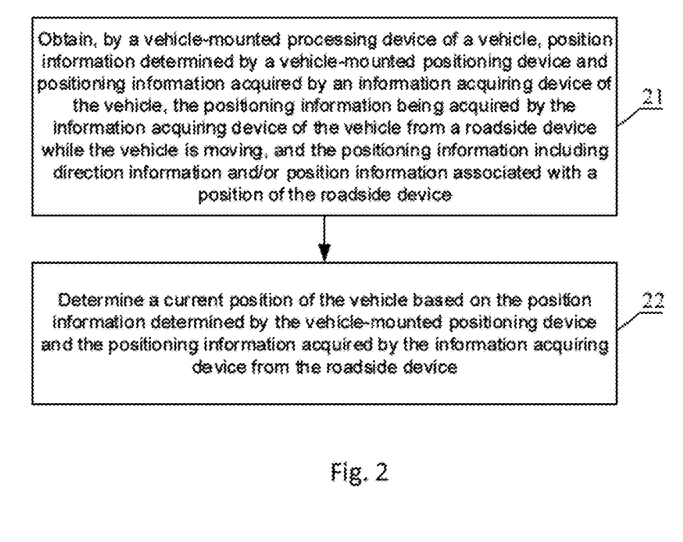
FIG. 2 is a flowchart illustrating a method for vehicle positioning according to some embodiments of the present disclosure.

FIG. 2 is a flowchart illustrating a method for vehicle positioning according to some embodiments of the present disclosure. The method may be applied in the vehicle 1 shown in FIG. 1. The method includes the following steps.

At step 21, a vehicle-mounted processing device of a vehicle obtains position information determined by a vehicle-mounted positioning device and positioning information acquired by an information acquiring device of the vehicle. The positioning information is acquired by the information acquiring device of the vehicle from a roadside device while the vehicle is moving. The positioning information includes direction information and/or position information associated with a position of the roadside device.

At step 22, the vehicle-mounted processing device determines a current position of the vehicle based on the position information determined by the vehicle-mounted positioning device and the positioning information acquired by the information acquiring device from the roadside device.

The vehicle 1 may acquire the positioning information pre-stored in the roadside device and determine the current position of the vehicle based on the positioning information along with the position information determined by the vehicle-mounted positioning device. In this way, the current position of the vehicle may be determined accurately and efficiently in scenarios there are many occlusions or weak GPS signals.

The process in the step 21 is explained below.

In some embodiments, the operation of the vehicle acquiring the positioning information included in the roadside device may include: Acquiring Scheme 1, in which the vehicle may identify the positioning information in a predetermined image provided by the roadside device; or Acquiring Scheme 2, in which the vehicle may trigger the roadside device and receive the positioning information transmitted from the roadside device in response to the trigger.

As described above, in some embodiments, in the Acquiring Scheme 1, a vehicle-mounted camera of the information acquiring device may capture the predetermined image provided by the roadside device, and an analyzing device of the information acquiring device may identify the positioning information from the captured image.

In some embodiments, in the Acquiring Scheme 2, the vehicle may trigger a switch device of the roadside device, a vehicle-mounted communication device in the information acquiring device of the vehicle may receive a positioning message transmitted from the roadside device in response to the trigger, and an analyzing device of the information acquiring device may parse the positioning message to obtain the positioning information. As described above, the switch device of the roadside device may be provided on the side of the road, on the surface of the road or above the road. When the vehicle, while moving, enters the operation range of the switch device or touches the switch device, the switch device may be triggered and the roadside device may transmit the positioning information in response to the trigger.

With the above acquiring schemes, the vehicle 1 may acquire the positioning information provided by the roadside device efficiently, which may be used as a data basis for determining the current position of the vehicle.

The process in the step 22 is explained below.

The vehicle-mounted processing device of the vehicle may determine the current position of the vehicle based on the position information determined by the vehicle-mounted positioning device and the positioning information acquired by the information acquiring device from the roadside device.

Here, the positioning information may include direction information and/or position information. The direction information and the position information may contain various types of different content. For example, the direction information may represent a direction of a position point where the roadside device itself is located, or a direction of a road (e.g., a one-way road) where the roadside device is located. The position information may be actual geographical position information or relative position information associated with the position of the roadside device. The relative position information may include: predetermined road number information associated with the position of the roadside device, map position information associated with the position of the roadside device, predetermined code information associated with the position of the roadside device, or any other similar equivalent or alternative information.

In a number of different embodiments, the following determining schemes may be used, depending on the content contained in the positioning information.

Determining Scheme 1

When the positioning information identified by the information acquiring device from the predetermined image includes the direction information, the process of determining the current position of the vehicle may include the following steps.

At step S1, the vehicle-mounted processing device obtains a measurement result from a vehicle-mounted ranging device, to determine a directional relationship and/or distance between the vehicle and the roadside device.

At step S2, the current position of the vehicle is determined based on the position information determined by the vehicle-mounted positioning device, the direction information acquired by the information acquiring device from the roadside device, and the determined directional relationship and/or distance between the vehicle and the roadside device.

For example, correspondingly to the above Acquiring Scheme 1, in a scenario associated with a cargo dock of a coastal port area, a roadside device A may be an information display device for displaying an image (e.g., a QR code) representing a direction of the roadside device A, e.g., the roadside device A faces east. The camera of the vehicle may capture the image and the vehicle-mounted processing device may parse the image to obtain its meaning. The vehicle-mounted processing device may obtain a measurement result from a vehicle-mounted ranging device, and determine a directional relationship and/or distance between the vehicle and the roadside device. For example, the roadside device A is located to the east of the vehicle and the distance between the vehicle and the roadside device A is 50 meters. That is, the position of the vehicle may be determined as 50 meters to the west of the roadside device, which is a relative position. With the relative position, along with a measurement result from the vehicle-mounted positioning device, an actual geographical position of the vehicle may be determined.

Determining Scheme 2

When the positioning information transmitted from the roadside device in response to the trigger by the vehicle and parsed by the information acquiring device includes the position information, the process of determining the current position of the vehicle may include the following steps.

At step S1', the vehicle-mounted processing device may determine a distance and directional relationship between the vehicle and the roadside devices based on respective signals received by at least two vehicle-mounted communication receivers of the vehicle (e.g., communication receivers 50 and 60 shown in FIG. 1) from the communication transmitter of the roadside device.

At step S2', the vehicle-mounted processing device may determine the current position of the vehicle based on the position information determined by the vehicle-mounted positioning device, the acquired position information of the roadside device, and the determined directional relationship and distance between the vehicle and the roadside device.

For example, correspondingly to the above Acquiring Scheme 2, in response to the trigger by the vehicle, the roadside device may transmit signals carrying the position information of the roadside device. The vehicle-mounted processing device may determine the distance and directional relationship between the vehicle and the roadside device by means of triangulation in the step S1', and then may determine the current position of the vehicle based on the position information determined by the vehicle-mounted positioning device, the position information of the roadside device, and the directional relationship and distance between the vehicle and the roadside device. The specific algorithm for determining the current position of the vehicle may be selected depending on requirements of specific application scenarios.

In the above description, the process of determining the current position of the vehicle when the positioning information includes the direction information or the position information has been described. When the positioning information includes both the direction information and the position information, the vehicle-mounted processing device may determine the current position of the vehicle in an easier and more efficient manner.

Further, in some embodiments of the present disclosure, some policies for determining the current position of the vehicle may be provided. These policies may be used with the above Determining Scheme 1 or 2, or any other determining scheme. The policies are described below.

Policy 1: When the position information included in the positioning information is actual geographical position information associated with the position of the roadside device, the process of determining the current position of the vehicle may include the following steps.

At step Sa, the vehicle-mounted processing device may compare the position information determined by the vehicle-mounted positioning device with the position information acquired from the roadside device.

At step Sb, a position determined by the vehicle-mounted positioning device may be determined as an actual position of the vehicle, when a difference between the position information determined by the vehicle-mounted positioning device and the position information acquired from the roadside device is smaller than a predetermined threshold; and, a current actual position of the vehicle may be determined in accordance with a predetermined determination rule, when the difference is larger than or equal to the predetermined threshold.

Here, the predetermined determination rule may be set depending on requirements of specific application scenarios and the present disclosure is not limited to any specific determination rule.

For example, when the roadside device is a Radio Frequency Identification (RFID) electronic tag, the vehicle may read the position information pre-stored in the roadside device when passing it. The position information may be the actual geographical position information associated with the position of the roadside device.

When the difference between the position determined by the vehicle-mounted positioning device and the position information acquired from the roadside device is smaller than or equal to a predetermined threshold, it may be considered that the received GPS signal is reliable and the position determined by the vehicle-mounted positioning device is the current position of the vehicle. When the difference is larger than the predetermined threshold, it may be determined that the position information determined by the vehicle-mounted positioning device is unreliable and the specific position of the vehicle may be determined in accordance with a predetermined determination rule. For example, the RFID electronic tag may further store identification data of the RFID, direction data and other data. The vehicle-mounted processing device may determine the relative positional relationship between the vehicle and the roadside device based on the pre-stored map data and the data stored in the RFID electronic tag, and determine the position of the vehicle based on related data such as the current speed of the vehicle and the operation range of the RFID device.

Policy 2: When the position information included in the positioning information is relative geographical position information associated with the position of the roadside device, the current position of the vehicle may be determined in accordance with actual requirements of vehicle positioning, which may include the following steps.

At step Su, the vehicle-mounted processing device may convert the relative geographical position information associated with the position of the roadside device as included in the positioning information into actual geographical position information based on map data, and determine a current actual geographical position of the vehicle based on the position information determined by the vehicle-mounted positioning device and the actual geographical position information associated with the position of the roadside device.

Alternatively, at step Sv, the vehicle-mounted processing device may convert the position information determined by the vehicle-mounted positioning device into relative position information in accordance with a predetermined conversion rule, and determine a current relative geographical position of the vehicle based on the relative position information determined by the vehicle-mounted positioning device and the relative geographical position information associated with the position of the roadside device.

That is, depending on actual requirements of vehicle positioning, the relative geographical position of the vehicle may be determined when the vehicle positioning requires the relative geographical position, or the actual geographical position of the vehicle may be determined when the vehicle positioning requires the actual geographical position.

Here, the predetermined conversion rule may be set depending on requirements of specific application scenarios.

Policy 3: In some other embodiments, when the vehicle-mounted positioning device of the vehicle fails to receive a GPS signal currently, i.e., when the vehicle-mounted processing device cannot obtain position information determined by the vehicle-mounted positioning device in a current processing period, the vehicle-mounted processing device may determine the current position of the vehicle based on position information determined by the vehicle-mounted positioning device in a previous processing period, a moving speed of the vehicle and the positioning information acquired from the roadside device. For the specific determining method, reference can be made to the above described Determining Scheme 1 or 2.

In a particular application scenario, the determining method may be set depending on specific requirements of the application and the present disclosure is not limited to any specific determining method.

With the solution according to the present disclosure, a roadside device is provided on a side of a road for facilitating positioning. The roadside device has positioning information pre-stored therein. A vehicle acquires the positioning information pre-stored in the roadside device while it is moving. The vehicle determines a current position of the vehicle based on position information determined by a vehicle-mounted positioning device and the positioning information acquired from the roadside device. Therefore, the position of the vehicle may be determined accurately even in a scenario where there are many occlusions or weak signals. In this way, it is possible to solve the problem in the related art that the position of the vehicle cannot be determined accurately when it is in a scenario where there are many occlusions or weak signals.

Based on the same inventive concept, an apparatus for vehicle positioning is also provided according to some embodiments of the present disclosure. The apparatus may be provided in the vehicle 1 shown in FIG. 1. The apparatus may be equivalent to the vehicle-mounted processing device 4 in the vehicle 1 shown in FIG. 1.

Figure 3:
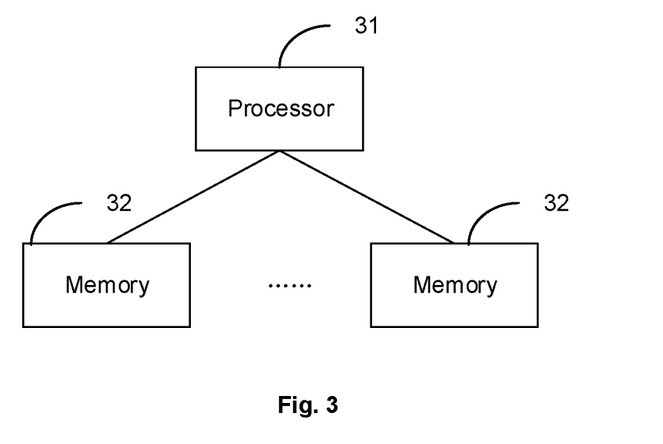
FIG. 3 is a schematic diagram showing a structure of an apparatus for vehicle positioning according to some embodiments of the present disclosure.

As shown in FIG. 3, an apparatus for vehicle positioning according to some embodiments of the present disclosure includes a processor 31 and at least one memory 32 storing at least one machine executable instruction.

The processor 31 is operative to execute the at least one machine executable instruction to: obtain position information determined by a vehicle-mounted positioning device of the vehicle and positioning information acquired by an information acquiring device of the vehicle, the positioning information being acquired by the information acquiring device of the vehicle from a roadside device while the vehicle is moving, and the positioning information including direction information and/or position information associated with a position of the roadside device; and determine a current position of the vehicle based on the position information determined by the vehicle-mounted positioning device and the positioning information acquired by the information acquiring device from the roadside device.

In some embodiments, when the positioning information is identified by the information acquiring device from a predetermined image provided by the roadside device and includes the direction information, the processor 31 being operative to execute the at least one machine executable instruction to determine the current position of the vehicle may include the processor 31 being operative to execute the at least one machine executable instruction to: obtain a measurement result from a vehicle-mounted ranging device, to determine a directional relationship and/or distance between the vehicle and the roadside device; and determine the current position of the vehicle based on the position information determined by the vehicle-mounted positioning device, the direction information acquired by the information acquiring device from the roadside device, and the determined directional relationship and/or distance between the vehicle and the roadside device.

In some embodiments, when the positioning information is parsed by the information acquiring device from positioning information transmitted from the roadside device in response to a trigger by the vehicle and includes the position information, the processor being operative to execute the at least one machine executable instruction to determine the current position of the vehicle may include the processor being operative to execute the at least one machine executable instruction to: determine a distance and directional relationship between the vehicle and the roadside device based on respective signals received by at least two vehicle-mounted communication receivers from the roadside device; and determine the current position of the vehicle based on the position information determined by the vehicle-mounted positioning device, the position information acquired by the information acquiring device from the roadside device, and the determined directional relationship and distance between the vehicle and the roadside device.

In some embodiments, when the position information included in the positioning information is actual geographical position information associated with the position of the roadside device, the processor 31 being operative to execute the at least one machine executable instruction to determine the current position of the vehicle may include the processor 31 being operative to execute the at least one machine executable instruction to: compare the position information determined by the vehicle-mounted positioning device with the position information acquired by the information acquiring device from the roadside device; and determine a position determined by the vehicle-mounted positioning device as an actual position of the vehicle when a difference between the position information determined by the vehicle-mounted positioning device and the position information acquired by the information acquiring device from the roadside device is smaller than a predetermined threshold, or determine a current actual position of the vehicle in accordance with a predetermined determination rule when the difference is larger than or equal to the predetermined threshold.

In some embodiments, when the position information included in the positioning information is relative geographical position information associated with the position of the roadside device, the processor 31 being operative to execute the at least one machine executable instruction to determine the current position of the vehicle may include the processor 31 being operative to execute the at least one machine executable instruction to: convert the relative geographical position information associated with the position of the roadside device as included in the positioning information into actual geographical position information based on map data, and determine a current actual geographical position of the vehicle based on the position information determined by the vehicle-mounted positioning device and the actual geographical position information associated with the position of the roadside device; or convert the position information determined by the vehicle-mounted positioning device into relative position information in accordance with a predetermined conversion rule, and determine a current relative geographical position of the vehicle based on the relative position information determined by the vehicle-mounted positioning device and the relative geographical position information associated with the position of the roadside device. The relative geographical position information associated with the position of the roadside device can include one of: predetermined road number information associated with the position of the roadside device, map position information associated with the position of the roadside device, or predetermined code information associated with the position of the roadside device.

In some embodiments, the processor 31 being operative to execute the at least one machine executable instruction to determine the current position of the vehicle may include the processor 31 being operative to execute the at least one machine executable instruction to: determine the current position of the vehicle based on position information determined by the vehicle-mounted positioning device in a previous processing period, a moving speed of the vehicle and the positioning information acquired from the roadside device, when position information determined by the vehicle-mounted positioning device in a current processing period is unavailable.

With the solution according to the present disclosure, a roadside device is provided on a side of a road for facilitating positioning. The roadside device has positioning information pre-stored therein. A vehicle acquires the positioning information pre-stored in the roadside device while it is moving. The vehicle determines a current position of the vehicle based on position information determined by a vehicle-mounted positioning device and the positioning information acquired from the roadside device. Therefore, the position of the vehicle may be determined accurately even in a scenario where there are many occlusions or weak signals. In this way, it is possible to solve the problem in the related art that the position of the vehicle cannot be determined accurately when it is in a scenario where there are many occlusions or weak signals.

Based on the same inventive concept, an apparatus for vehicle positioning is also provided according to an embodiment of the present disclosure. The apparatus can be provided in the vehicle 1 shown in FIG. 1. The apparatus may correspond to the vehicle-mounted processing device 4 in the vehicle 1 shown in FIG. 1.

Figure 4:
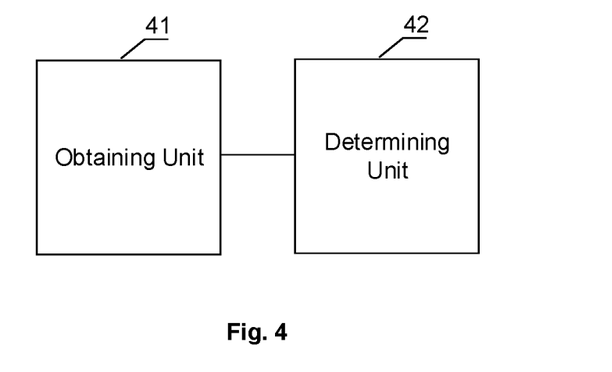
FIG. 4 is a schematic diagram showing another structure of an apparatus for vehicle positioning according to some embodiments of the present disclosure.

As shown in FIG. 4, an apparatus for vehicle positioning according to some embodiments of the present disclosure includes an obtaining module 41 and a determining module 42.

The obtaining module 41 is configured to obtain position information determined by a vehicle-mounted positioning device of the vehicle and positioning information acquired by an information acquiring device of the vehicle. The positioning information is acquired by the information acquiring device of the vehicle from a roadside device while the vehicle is moving. The positioning information includes direction information and/or position information associated with a position of the roadside device.

The determining module 42 is configured to determine a current position of the vehicle based on the position information determined by the vehicle-mounted positioning device and the positioning information acquired by the information acquiring device from the roadside device.

In some embodiments, when the positioning information is identified by the information acquiring device from a predetermined image provided by the roadside device and includes the direction information, the determining module 42 being configured to determine the current position of the vehicle may include the determining module 42 being configured to: obtain a measurement result from a vehicle-mounted distance measuring device, to determine a directional relationship and/or distance between the vehicle and the roadside device; and determine the current position of the vehicle based on the position information determined by the vehicle-mounted positioning device, the direction information acquired by the information acquiring device from the roadside device, and the determined directional relationship and/or distance between the vehicle and the roadside device.

In some embodiments, when the positioning information is parsed by the information acquiring device from positioning information transmitted from the roadside device in response to a trigger by the vehicle and includes the position information, the determining module 42 being configured to determine the current position of the vehicle may include the determining module 42 being configured to:

determine a distance and directional relationship between the vehicle and the roadside device based on respective signals received by at least two vehicle-mounted communication receivers from the roadside device; and determine the current position of the vehicle based on the position information determined by the vehicle-mounted positioning device, the position information acquired by the information acquiring device from the roadside device, and the determined directional relationship and distance between the vehicle and the roadside device.

In some embodiments, when the position information included in the positioning information is actual geographical position information associated with the position of the roadside device, the determining module 42 being configured to determine the current position of the vehicle may include the determining module 42 being configured to: compare the position information determined by the vehicle-mounted positioning device with the position information acquired by the information acquiring device from the roadside device; and determine a position determined by the vehicle-mounted positioning device as an actual position of the vehicle when a difference between the position information determined by the vehicle-mounted positioning device and the position information acquired by the information acquiring device from the roadside device is smaller than a predetermined threshold, or determine a current actual position of the vehicle in accordance with a predetermined determination rule when the difference is larger than or equal to the predetermined threshold.

In some embodiments, when the position information included in the positioning information is relative geographical position information associated with the position of the roadside device, the determining module 42 being configured to determine the current position of the vehicle may include the determining module 42 being configured to: convert the relative geographical position information associated with the position of the roadside device as included in the positioning information into actual geographical position information based on map data, and determine a current actual geographical position of the vehicle based on the position information determined by the vehicle-mounted positioning device and the actual geographical position information associated with the position of the roadside device; or convert the position information determined by the vehicle-mounted positioning device into relative position information in accordance with a predetermined conversion rule, and determine a current relative geographical position of the vehicle based on the relative position information determined by the vehicle-mounted positioning device and the relative geographical position information associated with the position of the roadside device. The relative geographical position information associated with the position of the roadside device can include one of: predetermined road number information associated with the position of the roadside device, map position information associated with the position of the roadside device, or predetermined code information associated with the position of the roadside device.

In some embodiments, the determining module 42 being configured to determine the current position of the vehicle may include the determining module 42 being configured to: determine the current position of the vehicle based on position information determined by the vehicle-mounted positioning device in a previous processing period, a moving speed of the vehicle and the positioning information acquired from the roadside device, when position information determined by the vehicle-mounted positioning device in a current processing period is unavailable.

With the solution according to the present disclosure, a roadside device is provided on a side of a road for facilitating positioning. The roadside device has positioning information pre-stored therein. A vehicle acquires the positioning information pre-stored in the roadside device while it is moving. The vehicle determines a current position of the vehicle based on position information determined by a vehicle-mounted positioning device and the positioning information acquired from the roadside device. Therefore, the position of the vehicle may be determined accurately even in a scenario where there are many occlusions or weak signals. In this way, it is possible to solve the problem in the related art that the position of the vehicle cannot be determined accurately when it is in a scenario where there are many occlusions or weak signals.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A system for vehicle positioning, comprising:
a vehicle; and
at least one roadside device, the at least one roadside device being on a side of a road, on a surface of the road or above the road, the at least one roadside device comprising an image display device or a billboard displaying a predetermined image comprising the predetermined positioning information, the predetermined image comprising at least one of a bar code, or a Quick Response (QR) code,
wherein the roadside device is configured to store predetermined positioning information including direction information associated with a position of the roadside device indicating a direction the roadside device faces, and position information associated with the position of the roadside device,
wherein the vehicle comprises an information acquiring device configured to acquire the predetermined positioning information stored in the roadside device while the vehicle is moving, the information acquiring device of the vehicle comprising a camera, the camera is configured to capture an image of the predetermined image displayed on the image display device or billboard of the at least one roadside device,
wherein the vehicle further comprises a vehicle-mounted processing device configured to obtain position information determined by a vehicle-mounted positioning device and the predetermined positioning information acquired by the information acquiring device,
wherein the position information determined by the vehicle-mounted positioning device is a Global Positioning System (GPS) information,
wherein the vehicle-mounted processing device is configured to obtain, in response to determining that the predetermined positioning information acquired by the information acquiring device comprises the direction information associated with the position of the roadside device, a measurement result from a vehicle-mounted ranging device to determine:
a directional relationship between the vehicle and the roadside device, and
a distance between the vehicle and the roadside device, and determine a current position of the vehicle based on the position information determined by the vehicle-mounted positioning device, the direction information associated with the position of the roadside device, and the determined directional relationship and distance between the vehicle and the roadside device, and
wherein the vehicle-mounted processing device is configured to determine a distance and a directional relationship between the vehicle and the roadside device based on respective signals received by at least two vehicle-mounted communication receivers of the vehicle from a communication transmitter of the roadside device in response to determining that the predetermined positioning information acquired by the information acquiring device comprises the position information associated with the position of the roadside device, and determine the current position of the vehicle based on the position information determined by the vehicle-mounted positioning device, the position information associated with the position of the roadside device acquired by the information acquiring device from the roadside device, and the determined directional relationship and distance between the vehicle and the roadside device.

2. The system of claim 1, wherein the vehicle-mounted processing device is configured to:
compare, in response to determining that the position information included in the predetermined positioning information is actual geographical position information associated with the position of the roadside device, the position information determined by the vehicle-mounted positioning device with the position information acquired by the information acquiring device from the roadside device;
determine the position determined by the vehicle-mounted positioning device as a current actual position of the vehicle in response to a difference between the position information determined by the vehicle-mounted positioning device and the position information acquired by the information acquiring device from the roadside device being smaller than a predetermined threshold; and
determine the current actual position of the vehicle in accordance with a predetermined determination rule in response to the difference being larger than or equal to the predetermined threshold.

3. The system of claim 1, wherein the vehicle-mounted processing device is configured to:
convert, in response to determining that the position information included in the predetermined positioning information is relative geographical position information associated with the position of the roadside device, the relative geographical position information associated with the position of the roadside device as included in the predetermined positioning information into actual geographical position information based on map data, and determine a current actual geographical position of the vehicle based on the position information determined by the vehicle-mounted positioning device and the actual geographical position information associated with the position of the roadside device; or convert the position information determined by the vehicle-mounted positioning device into relative position information in accordance with a predetermined conversion rule, and determine a current relative geographical position of the vehicle based on the relative position information and the relative geographical position information associated with the position of the roadside device;

wherein the relative geographical position information associated with the position of the roadside device comprises one of: predetermined road number information associated with the position of the roadside device, map position information associated with the position of the roadside device, or predetermined code information associated with the position of the roadside device.

4. The system of claim 1, wherein the vehicle-mounted processing device is configured to:

determine the current position of the vehicle based on position information determined by the vehicle-mounted positioning device in a previous processing period, a moving speed of the vehicle and the predetermined positioning information acquired from the roadside device, in response to the vehicle-mounted positioning device failing to receive a Global Positioning System (GPS) signal in a current processing period.

5. A method of vehicle positioning, comprising:

obtaining, by a vehicle-mounted processing device, position information determined by a vehicle-mounted positioning device and positioning information acquired by an information acquiring device of the vehicle from a roadside device while the vehicle is moving, the information acquiring device of the vehicle comprising a camera, the camera is configured to capture an image of the predetermined image displayed on the image display device or billboard of the roadside device, wherein the positioning information includes direction information associated with a position of the roadside device indicating a direction the roadside device faces, and position information associated with the position of the roadside device, the roadside device comprising an image display device or a billboard displaying a predetermined image comprising the positioning information, the predetermined image comprising at least one of a bar code, or a Quick Response (QR) code, wherein the camera is configured to capture an image of the predetermined image displayed on the image display device or billboard of the roadside device, wherein the position information determined by the vehicle-mounted positioning device is a Global Positioning System (GPS) information, wherein the vehicle-mounted processing device is configured to obtain, in response to determining that the positioning information acquired by the information acquiring device comprises the direction information associated with the position of the roadside device, a measurement result from a vehicle-mounted ranging device to determine:

a directional relationship between the vehicle and the roadside device, and a distance between the vehicle and the roadside device, identifying the positioning information from the image of the predetermined image captured by the camera; and determining a current position of the vehicle based on the position information determined by the vehicle-mounted positioning device, the direction information associated with the position of the roadside device, and the determined directional relationship and distance between the vehicle and the roadside device, and wherein the vehicle-mounted processing device is configured to determine a distance and a directional relationship between the vehicle and the roadside device based on respective signals received by at least two vehicle-mounted communication receivers of the vehicle from a communication transmitter of the roadside device in response to determining that the positioning information acquired by the information acquiring device comprises the position information associated with the position of the roadside device, and determine the current position of the vehicle based on the position information determined by the vehicle-mounted positioning device, the position information associated with the position of the roadside device acquired by the information acquiring device from the roadside device, and the determined directional relationship and distance between the vehicle and the roadside device.

6. The method of claim 5, wherein, when the position information included in the positioning information is actual geographical position information associated with the position of the roadside device, said determining the current position of the vehicle comprises:

comparing, by the vehicle-mounted processing device, the position information determined by the vehicle-mounted positioning device with the position information acquired by the information acquiring device from the roadside device;

determining the position determined by the vehicle-mounted positioning device as a current actual position of the vehicle in response to a difference between the position information determined by the vehicle-mounted positioning device and the position information acquired by the information acquiring device from the roadside device being smaller than a predetermined threshold; and determining a current actual position of the vehicle in accordance with a predetermined determination rule in response to the difference being larger than or equal to the predetermined threshold.

7. The method of claim 5, wherein, when the position information included in the positioning information is relative geographical position information associated with the position of the roadside device, said determining the current position of the vehicle comprises:

converting, by the vehicle-mounted processing device, the relative geographical position information associated with the position of the roadside device as included in the positioning information into actual geographical position information based on map data, and determining a current actual geographical position of the vehicle based on the position information determined by the vehicle-mounted positioning device and the actual geographical position information associated with the position of the roadside device; or converting, by the vehicle-mounted processing device, the position information determined by the vehicle-mounted positioning device into relative position information in accordance with a predetermined conversion rule, and determining a current relative geographical position of the vehicle based on the relative position information and the relative geographical position information associated with the position of the roadside device, wherein the relative geographical position information associated with the position of the roadside device comprises one of: predetermined road number information associated with the position of the roadside device, map position information associated with the position of the roadside device, or predetermined code information associated with the position of the roadside device.

8. The method of claim 5, wherein said determining the current position of the vehicle comprises:

determining, by the vehicle-mounted processing device, the current position of the vehicle based on position information determined by the vehicle-mounted positioning device in a previous processing period, a moving speed of the vehicle and the positioning information acquired from the roadside device, in response to the vehicle-mounted positioning device failing to receive a Global Positioning System (GPS) signal in a current processing period.

9. An apparatus in a vehicle for vehicle positioning, comprising: a processor and a memory storing at least one machine executable instruction, wherein the processor is configured to execute the at least one machine executable instruction to:

obtain position information determined by a vehicle-mounted positioning device and positioning information acquired by an information acquiring device of the vehicle from a roadside device while the vehicle is moving, the information acquiring device of the vehicle comprising a camera, wherein the positioning information includes:

direction information associated with a position of the roadside device indicating a direction the roadside device faces, and position information associated with the position of the roadside device, wherein the roadside device comprises an image display device or a billboard displaying a predetermined image comprising the positioning information, further wherein the predetermined image comprises at least one of a bar code, or a Quick Response (QR) code, wherein the camera is configured to capture an image of the predetermined image displayed on the image display device or billboard of the roadside device; and wherein the position information determined by the vehicle-mounted positioning device is a Global Positioning System (GPS) information;

obtain, in response to determining that the positioning information acquired by the information acquiring device comprises the direction information associated with the position of the roadside device, a measurement result from a vehicle-mounted ranging device to determine:

a directional relationship between the vehicle and the roadside device, and a distance between the vehicle and the roadside device, and determine a current position of the vehicle based on the position information determined by the vehicle-mounted positioning device, the direction information associated with the position of the roadside device, and the determined directional relationship and distance between the vehicle and the roadside device; and determine a distance and a directional relationship between the vehicle and the roadside device based on respective signals received by at least two vehicle-mounted communication receivers of the vehicle from a communication transmitter of the roadside device in response to determining that the positioning information acquired by the information acquiring device comprises the position information associated with the position of the roadside device, and determine the current position of the vehicle based on the position information determined by the vehicle-mounted positioning device, the position information associated with the position of the roadside device acquired by the information acquiring device from the roadside device, and the determined directional relationship and distance between the vehicle and the roadside device.

10. The apparatus of claim 9, wherein the processor is configured to execute the at least one machine executable instruction to:

compare, in response to determining that the position information included in the positioning information is actual geographical position information associated with the position of the roadside device, the position information determined by the vehicle-mounted positioning device with the position information acquired by the information acquiring device from the roadside device;

determine the position determined by the vehicle-mounted positioning device as a current actual position of the vehicle in response to a difference between the position information determined by the vehicle-mounted positioning device and the position information acquired by the information acquiring device from the roadside device being smaller than a predetermined threshold; and determine the current actual position of the vehicle in accordance with a predetermined determination rule in response to the difference being larger than or equal to the predetermined threshold.

11. The apparatus of claim 9, wherein, when the position information included in the positioning information is relative geographical position information associated with the position of the roadside device, the processor being operative to execute the at least one machine executable instruction to determine the current position of the vehicle comprises the processor being operative to execute the at least one machine executable instruction to:

convert the relative geographical position information associated with the position of the roadside device as included in the positioning information into actual geographical position information based on map data, and determine a current actual geographical position of the vehicle based on the position information determined by the vehicle-mounted positioning device and the actual geographical position information associated with the position of the roadside device; or convert the position information determined by the vehicle-mounted positioning device into relative position information in accordance with a predetermined conversion rule, and determine a current relative geographical position of the vehicle based on the relative position information and the relative geographical position information associated with the position of the roadside device, wherein the relative geographical position information associated with the position of the roadside device comprises one of: predetermined road number information associated with the position of the roadside device, map position information associated with the position of the roadside device, or predetermined code information associated with the position of the roadside device.

12. The apparatus of claim 9, wherein the processor is configured to execute the at least one machine executable instruction to:
  determine the current position of the vehicle based on position information determined by the vehicle-mounted positioning device in a previous processing period, a moving speed of the vehicle and the positioning information acquired from the roadside device, in response to the vehicle-mounted positioning device failing to receive a Global Positioning System (GPS) signal in a current processing period.

13. The system of claim 1, wherein the information acquiring device of the vehicle comprises the vehicle-mounted communication receiver,
  wherein the roadside device comprises a communication device including a switch device and the communication transmitter,
  wherein the vehicle is configured to trigger the switch device and wherein the switch device is configured to trigger the communication transmitter to transmit the predetermined positioning information in a positioning message, and
  wherein the vehicle-mounted communication receiver is configured to receive the positioning message.

14. The system of claim 13, wherein the switch device comprises at least one of a mechanical switch device, a photoelectrical switch device, an electric approach switch, or a touch switch, and
  wherein the switch device is provided on the side of the road, on the surface of the road or above the road.

15. The method of claim 5, wherein the information acquiring device of the vehicle comprises the vehicle-mounted communication receiver,
  wherein the roadside device comprises a communication device including a switch device and the communication transmitter,
  wherein the vehicle is configured to trigger the switch device and wherein the switch device is configured to trigger the communication transmitter to transmit the positioning information in a positioning message,
  wherein the vehicle-mounted communication receiver is configured to receive the positioning message, and
  wherein the method further comprises parsing the positioning message to obtain the positioning information.

16. The apparatus of claim 9, wherein the information acquiring device of the vehicle comprises the vehicle-mounted communication receiver,
  wherein the roadside device comprises a communication device including a switch device and the communication transmitter,
  wherein the vehicle is configured to trigger the switch device and wherein the switch device is configured to trigger the communication transmitter to transmit the positioning information in a positioning message, and
  wherein the vehicle-mounted communication receiver is configured to receive the positioning message.

* * * * *